(12) United States Patent
Jiang et al.

(10) Patent No.: US 7,282,713 B2
(45) Date of Patent: Oct. 16, 2007

(54) COMPOSITIONS AND METHODS FOR SCINTILLATOR ARRAYS

(75) Inventors: Haochuan Jiang, Brookfield, WI (US); David Michael Hoffman, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 174 days.

(21) Appl. No.: 10/865,213

(22) Filed: Jun. 10, 2004

(65) Prior Publication Data

US 2005/0274895 A1 Dec. 15, 2005

(51) Int. Cl.
- *G01T 1/20* (2006.01)
- *G01T 1/24* (2006.01)
- *C09K 11/02* (2006.01)
- *C09K 11/08* (2006.01)
- *C09K 11/77* (2006.01)

(52) U.S. Cl. .............. 250/361 R; 250/370.11; 250/367; 252/301.4 R

(58) Field of Classification Search ............... None
See application file for complete search history.

(56) References Cited

U.S. PATENT DOCUMENTS

| | | | | |
|---|---|---|---|---|
| 3,225,193 A * | 12/1965 | Hilton et al. | ............... | 250/367 |
| 4,415,810 A * | 11/1983 | Brown, Sr. | ............... | 250/487.1 |
| 5,168,540 A * | 12/1992 | Winn et al. | ............... | 385/128 |
| 5,220,170 A | 6/1993 | Cox et al. | | |
| 5,260,981 A | 11/1993 | Uyama | | |
| 5,308,986 A | 5/1994 | Walker | | |
| 5,606,638 A | 2/1997 | Tymianski et al. | | |
| 5,636,299 A * | 6/1997 | Bueno et al. | ............... | 385/15 |
| 5,898,753 A | 4/1999 | Schick et al. | | |
| 5,912,942 A | 6/1999 | Schick et al. | | |
| 6,197,710 B1 * | 3/2001 | Ohara et al. | ............... | 501/4 |
| 6,208,710 B1 | 3/2001 | Nagai | | |
| 6,384,400 B1 | 5/2002 | Albagli et al. | | |
| 6,448,566 B1 * | 9/2002 | Riedner et al. | ............... | 250/483.1 |
| 6,480,563 B2 * | 11/2002 | Hoffman et al. | ............... | 378/19 |
| 6,498,828 B2 | 12/2002 | Jiang | | |
| 6,704,391 B2 * | 3/2004 | Hoffman et al. | ............... | 378/98.8 |
| 6,710,350 B2 * | 3/2004 | Ruzga | ............... | 250/368 |
| 6,775,348 B2 * | 8/2004 | Hoffman | ............... | 378/19 |
| 7,067,816 B2 * | 6/2006 | Dorenbos et al. | ............... | 250/370.11 |
| 2003/0202633 A1 | 10/2003 | Hoffman | | |

FOREIGN PATENT DOCUMENTS

JP 10073667 A * 3/1998

OTHER PUBLICATIONS

Agrawal, Govind P. Fiber-Optic Communication Systems. N.Y., John Wiley and Sons, 1997. p. 66-68 TK5103.59.A37.*
Madou, M. Fundamentals of Microfabrication. N.Y., CRC Press, 1997. p. 105. TK7836.M33.*

* cited by examiner

*Primary Examiner*—David Porta
*Assistant Examiner*—Frederick F Rosenberger
(74) *Attorney, Agent, or Firm*—Armstrong Teasdale LLP

(57) ABSTRACT

A composition including at least one of a glass composition and a glass ceramic composition, the composition includes a plurality of scintillator crystals.

29 Claims, 5 Drawing Sheets

COMPOSITIONS AND METHODS FOR SCINTILLATOR ARRAYS

BACKGROUND OF THE INVENTION

The invention relates generally to Computed Tomography (CT) systems, and more particularly, to a CT scintillator array using glass and glass ceramic fiber.

CT systems use scintillator detectors to convert a received X-ray intensity to an electrical signal. The scintillator detector includes a scintillator and a photodiode tightly coupled to each other. Scintillators are materials that emit visible or ultraviolet light after interaction of ionizing radiation such as X-rays. The light thus emitted is detected by the photodetector, and converted to an electrical signal.

Such scintillator detectors in CT systems are arranged in the form of scintillator arrays called packs. The packs are arranged to capture different picture elements (hereinafter referred to as pixels) of the desired scan image. The resolution of the scan image is directly related to the size of the pixels in the packs. For better resolution images, smaller pixels are desired. Hence, very accurate dicing and grinding processes are required to control the size of the pixels within the packs.

This leads to various complications in the fabrication process for such packs. The first challenge is the alignment of the pixels. An accurate gap is useful between pixels to allow the use of a castable or other type of reflector. Also the alignment between the collimator and the pack is desirable. Misalignment with the collimator may cause cross-talk and other things that can generate image artifacts. The specification for misalignment between the collimator and the pack is very limited to maintain acceptable image quality. This limited specification for misalignment leads to thick tungsten plates that reduce the detectors dose efficiency. Tungsten plates eliminate scattered X-rays and thus reduce image noise and increase contrast. The tungsten plates also reduce X-ray punch-through that causes noise in the photodiode and radiation damage. Another challenge is the alignment between the pack and photodiode. Misalignment between the pack and photodiode can cause cross-talk between the pixels. This misalignment can also lead to X-ray generated noise, and radiation damage to the photodiodes.

Due to the stringent fabrication requirements described above, the manufacturing process for the packs becomes expensive. Further, the limitations in the design of these packs restrict the applications areas. For instance, the resolution of the image scanned by a CT system is constrained by the design of the pack used in the CT system.

BRIEF DESCRIPTION OF THE INVENTION

In one aspect, a composition including at least one of a glass composition and a glass ceramic composition is provided. The composition includes a plurality of scintillator crystals.

In another aspect, a scintillator array including a plurality of fibers is provided. The fibers include at least one of a glass composition and a glass ceramic. The fibers also include a plurality of scintillator crystals.

In still another aspect, a method is provided. The method includes providing a glass powder with a particle size of between 1 and 5 μm, providing a plurality of scintillator crystals with a particle size of 1 to 20 μm, and mixing the glass powder and the scintillators together to obtain a resultant mixture wherein 40 to 80 percent is scintillator crystals and 20 to 60 percent is glass powder.

In another aspect, a computed tomography (CT) system is provided. The system includes an x-ray source, and a detector positioned to receive x-rays emitted from the source. The detector includes a photodiode array, and a scintillator array positioned between the photodiode array and the source. The scintillator including a plurality of fibers including at least one of a glass and a glass-ceramic.

DETAILED DESCRIPTION OF THE INVENTION

Herein are described methods and apparatus for providing a glass composition or glass ceramic composition used in making scintillator arrays suitable for use in CT systems. A glass composition is a chemical formula for a glass that provides desired chemical and physical properties. The important properties include transparency, durability, melting point, refractive index, density, etc. As used herein the term glass refers to a composition containing non-organic material in an amorphous lattice structure (i.e., in a glassy phase). Also as used herein the term glass-ceramic refers to a composition containing non-organic material which was a glass and went through a process that changed the amorphous lattice structure to a crystalline lattice structure. The glass-ceramic composition needs to enable homogeneous crystal growth during heat treatment and provide sufficient scintillator crystals in the glass matrix, while retaining high transparency. As an example. a composition, such as the glass composition and the glass-ceramic composition, includes a plurality of scintillator crystals and has a refractive index between 1.8 and 1.9, such as 1.85. The scintillator crystals include at least one of Tb—Lu—Al—O—Ce, $LuSiO_5$:Ce, $Gd_2O_2S$:Pr,Ce,F, $Gd_3Ga_5O_{12}$:Cr,Ce, $LuAlO_3$:Ce, $Y_3Al_5O_{12}$:Ce, $Bi_4Ge_3O_{12}$, and $(Y_{1.67}Gd_{0.33}Eu_{0.1})O_2$.

Figure 1:
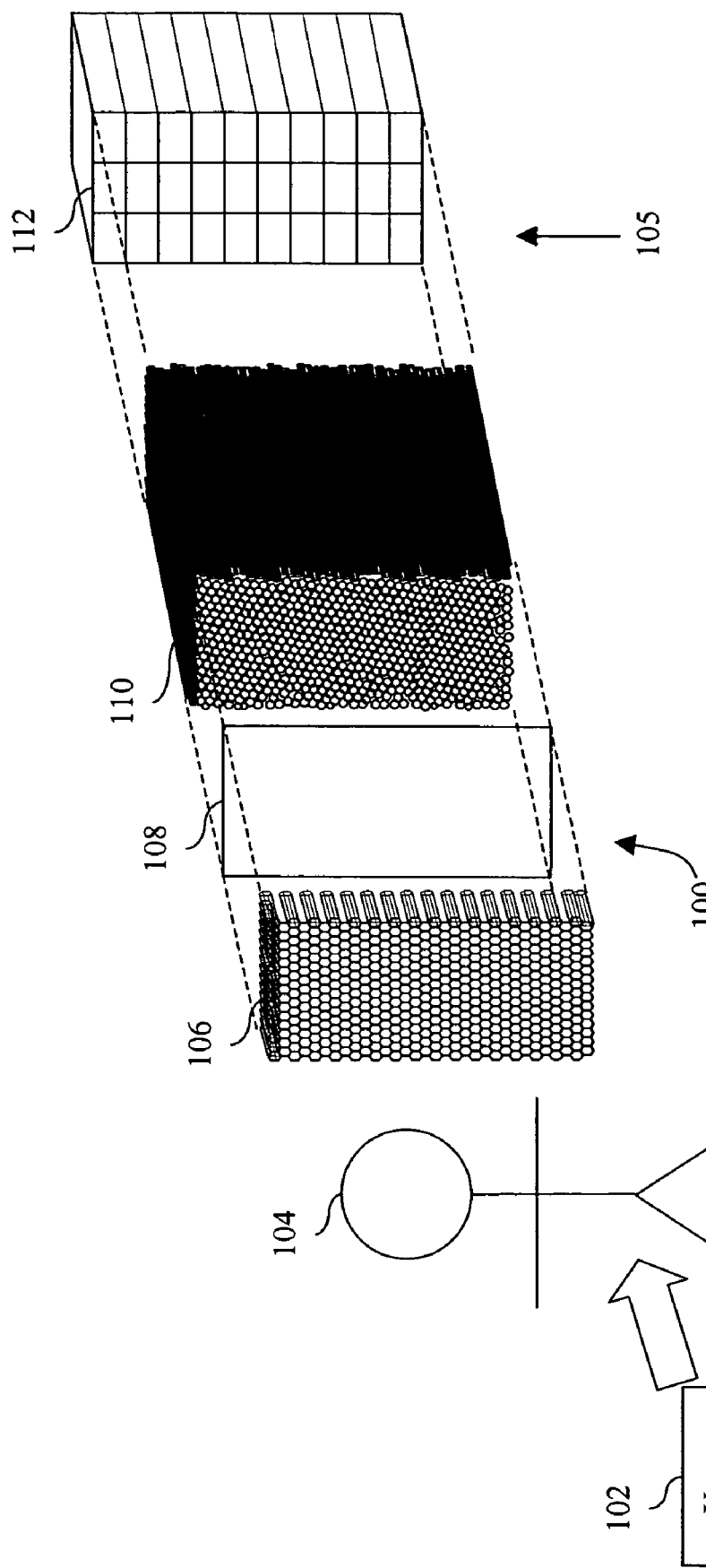
FIG. 1 shows a CT system according to an embodiment of the invention.

FIG. 1 shows a CT system 100 according to one embodiment. The figure shows an X-ray source 102 projecting X-rays on an object 104 such as a patient 104. After passing through object 104 the attenuated X-rays pass through a collimator 106, and then are received at a detector 105 including a reflector 108, a scintillator pack 110, and a plurality of photodiodes 112. In various embodiments, reflector 108 is an optically reflective material such as a reflective tape. The X-rays pass through reflector 108 and strike pack 110. Pack 110 includes fibers containing scintillator crystals. In various embodiments, the fibers are held together using an adhesive such as a $TiO_2$ loaded adhesive. In various embodiments, the fibers are coated using low reflective index coatings such as epoxy, silicone, or other organic coatings, and then further coated with highly reflective metals such as Aluminum (Al), Silver (Ag) or Gold (Au). The incident X-ray radiation causes the scintillator crystals to emit light. In various embodiments, pack 110 is designed to direct a substantial part of the emitted light intensity towards an array of photodiodes 112. Reflector 108 reflects visible light emitted toward object 104 back toward photodiodes 112. Photodiodes 112 convert the incident light into electrical signals. The electrical signals are used to obtain the scanned image.

Figure 2:
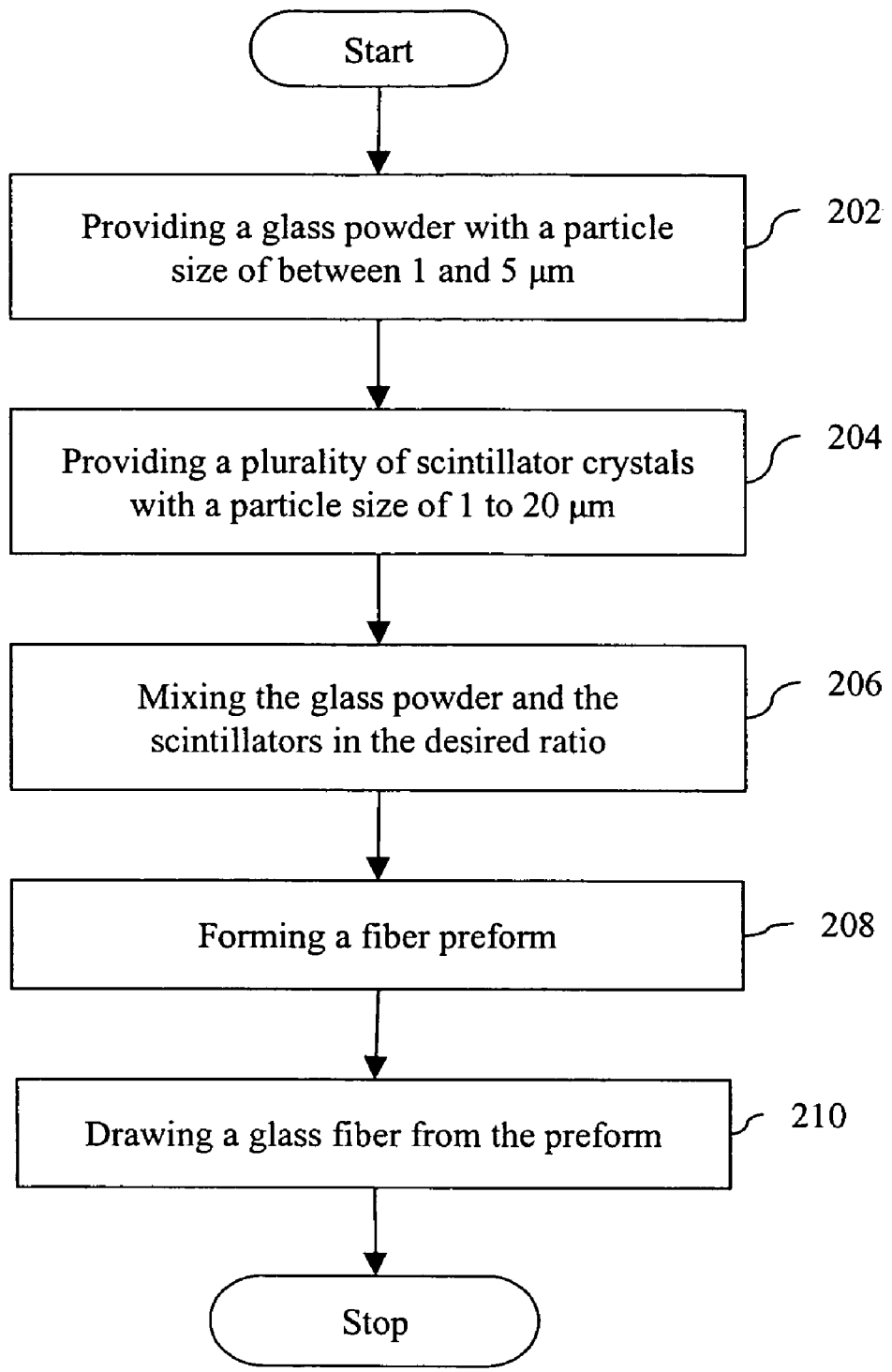
FIG. 2 is a flowchart illustrating a method of preparing a glass fiber preform according to various embodiments of the invention.

FIG. 2 is a flowchart illustrating a method of preparing a glass fiber preform according to various embodiments. At step 202, a glass powder is provided. In various embodiments, constituents $SiO_2$—$Bi_2O_3$—PbO—$TiO_2$—$K_2O$—BaO—SrO—$TeO_2$—$Ta_2O_5$ are used. In various embodiments, the glass powder is prepared by melting, homogenizing and degassing the constituents of the glass. After the melting, the glass is quenched in cold water or liquid nitrogen and ball milled to obtain the glass powder. After ball milling, the glass powder will have a size smaller than 5 μm. Then at step 204, a plurality of scintillator crystals are provided. In various embodiments, scintillators such as Tb—Lu—Al—O—Ce are used. One of the desired composition of the scintillator crystals is $(Tb, Lu, Ce)_3Al_5O_{12}$. The scintillator crystals are synthesized and also milled into a size smaller than 20 μm.

Then at step 206, the glass powder and the scintillator crystals are mixed in a desired ratio. According to various embodiments of the invention, the desired ratio is such that the mixture contains 40 to 80 volume percent (including all sub-ranges thereof) scintillator crystals and 20 to 60 (including all sub-ranges thereof) volume percent glass powder. The volume percentages of the glass powder and scintillator crystals are designed as such that the optimum properties will be achieved. Sufficient glass phase is desired to provide a continuous matrix for the scintillator crystals. However, one may desire to maximize the volume percentage of the scintillator crystals in order to maximize X-ray detection efficiency and light output. Then at step 208, a fiber preform is formed from the mixture. In various embodiments, the glass preform is prepared by re-melting and pulling the mixture in a mold to form the fiber preform with a diameter of about 50 cm. Further, the fiber preform is annealed to reduce the thermal stress developed during the above forming process and prevent cracking while being heated up again for fiber drawing.

In another embodiment, the mixture is sintered below the melting temperature of the glass, but above the transition temperature of the glass. This enables the formation of a substantially continuous matrix for the scintillator crystals in the glass, substantially without pores or voids. The sintered pieces are machined into a circular fiber preform and the surface of the preform may be treated if desired. The surface can be ground and then etched with chemicals to ensure smoothness. The smoothness of the preform surface makes it easy to control the size of the fiber and reduce or prevent defects such as pores and voids. Finally at step 210, the glass preform is used to draw glass fibers. The resultant glass fibers contain a substantially uniform distribution of scintillator crystals.

In one example, a glass containing 30% (mole) $SiO_2$, 20% $Bi_2O_3$, 10% PbO, 10% $TiO_2$, 20% $K_2O$, and 10% BaO is melted in platinum crucible at 1300° C. The glass melt is held at that temperature for at least 4 hours to homogenize and remove air bubbles. Then the glass melt is poured into a water bath or a liquid nitrogen bath. The glass melt cools into glass powder. The glass powder is collected and ball milled with zirconia milling balls. After milling, the glass powder is dried and sieved to screen out the larger ones. In this example, the scintillator crystals have a composition of $Tb_{2.18}Lu_{0.8}Ce_{0.02}Al_5O_{12}$. The scintillator crystals are synthesized using a wet chemical method to control their composition and particle size. 40% (volume) of the above glass powder and 60% (volume) of the scintillator crystals are mixed together using a ball mill.

Figure 3:
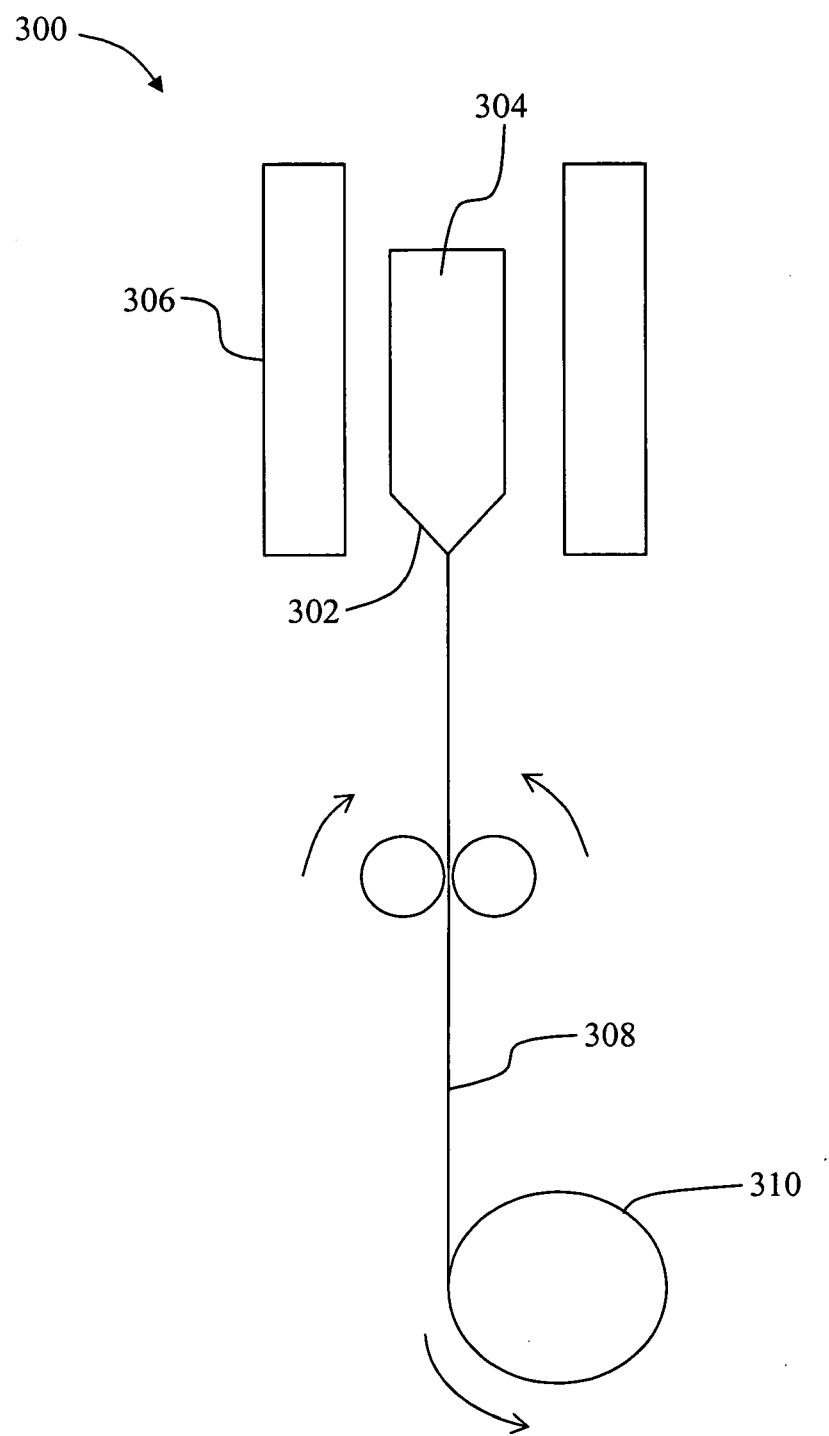
FIG. 3 shows a system for drawing glass fibers from a fiber preform.

The mixture is then sintered in a metal mold under vacuum. The vacuum extracts all the air pores in the final sintered preform. A pressure is also added to assist the sintering. The sintering temperature in this example is about 600° C. At this temperature the glass will flow and form a continuous matrix, while the scintillator crystals remain in their original shape and composition. After sintering, the preform is transparent because the refractive index of the glass matrix and the crystals are very closely matched. The fiber preform formed by the sintering method is drawn into fibers as shown in FIG. 3. In this particular example, the fiber drawing temperature is about 700° C. The metal mold is made of steel.

In various embodiments, the glass fiber thus obtained is converted to glass-ceramic fiber. For this conversion, the constituents of the glass powder used at step 202 are selected as $SiO_2$—$Al_2O_3$—$Tb_2O_3$—$Lu_2O_3$—$Ce_2O_3K_2O$—$Na_2O$—$B_2O_3$—$Ga_2O_3$—$Sc_2O_3$. The concentration of $SiO_2$ in the glass powder is about 10 to 25 atm % (percentage of atoms), while the total content of BaO—SrO—$K_2O$—$Na_2O$—$B_2O_3$—$Ga_2O_3$—$Sc_2O_3$ is about 10 to 20 atm % (including all sub-ranges thereof). The sub-range is selected such that the final glass-ceramic material will have sufficient scintillator crystals to achieve sufficient X-ray detection efficiency and light output. However, a minimum glassy phase is needed to provide a continuous matrix for the scintillator crystals. In this glass-ceramic method, the composition needs to enable a formation of uniform glass and then make it possible to re-crystallize the scintillator phase out of the glass. The ratio of $Al_2O_3$, $Tb_2O_3$ and $Lu_2O_3$ is selected such that it ensures a substantially pure garnet phase for the final crystallized glass-ceramic.

In one embodiment, the ratio of Tb:Lu:Ce::Al:O is 2.18: 0.8:0.02:5:12 (atomic ratio). The concentration of $Ce_2O_3$ is about 0.05 to 1.5% (including all sub-ranges thereof). Sufficient Ce is needed for light conversion, but too much Ce will cause light photon quenching. The high purity raw materials of these components ($Tb_4O_7$ for $Tb_2O_3$ and $CeO_2$ for $Ce_2O_3$) are mixed and melted in a Platinum crucible at a temperature at about 1400° C. Thereafter, steps 208 and 210 are preformed to obtain a glass fiber. Then, the glass fiber is heated to about 100° C. above its glass transition temperature for up to 8 hours to allow crystal nuclei to form. After the crystal nuclei have formed, the temperature is further raised by another 80 C to grow the crystallites. The glass fiber is kept at this temperature for about 24 hours to convert it into a glass-ceramic fiber. The resulting glass-ceramic fiber is transparent and contains 30 to 70% (including all sub-ranges thereof) crystallized scintillator phase. The crystallites in the glass-ceramic fiber have a very small size (smaller than 200 nm), therefore the light scattering by this fiber is limited.

In one particular example for the glass-ceramic method, a start composition of the glass is $Si_{0.4}B_{0.2}Sc_{0.2}K_{0.2}Na_{0.2}Ba_{0.1}Tb_{1.302}Lu_{0.48}Ce_{0.018}Al_{3.0}O_{92}$. The high purity oxide raw materials with the above composition are mixed with a ball mill. The mixture is then transferred into a platinum crucible and melted at about 1400° C. for 4 hours. The glass melt is then poured into a metal cylindrical mold preheated to about 300° C. This will form the glass fiber preform. The fiber preform is moved into a furnace to anneal for about 4 hours. The annealing temperature is about 500° C. After annealing, the glass preform is drawn into fiber as shown in FIG. 3. The fiber drawing temperature in this particular example is about 800° C. The glass fiber is placed in a furnace and heated to about 600° C. for 8 hours to form crystal nuclei. After that, the temperature is raised to about 700° C. to grow the crystals. This crystal growth process takes about 24 hours. The glass-ceramic fiber obtained is transparent and has more than 50% (volume) of scintillator crystal phase. Scintillator packs are made from these fibers following steps shown in FIG. 4

FIG. 3 shows a system 300 including a platinum crucible 302 containing a fiber preform 304. Platinum crucible 302 is placed in a heating furnace 306. A strand of glass fiber 308 is drawn from fiber preform 304 and connected to a spool 310. In an embodiment, the cross-section of the drawn fiber may be circular, and of the same or different radii. In another embodiment, the cross-section of the drawn fiber may be rectangular in shape, with varying side lengths. The cross-section shape is achieved with the shape of the crucible orifice. For instance, a hexagonal orifice will generate a hexagonal fiber. It is also important to control the fiber drawing temperature. If the temperature is too high, the fiber will be round with any orifice shape. So it is important to keep the temperature lower so the fiber can be drawn while the shape after the orifice can be maintained. Spool 310 is rotated anti-clockwise to draw out more glass fiber 308 from fiber preform 304. The drawn glass fiber 308 is collected on spool 310.

Glass fiber 308 thus drawn is used to create scintillator arrays such as pack 110. The various steps involved in preparing pack 110 using glass fiber 308 are now described with reference to FIG. 4.

Figure 4:
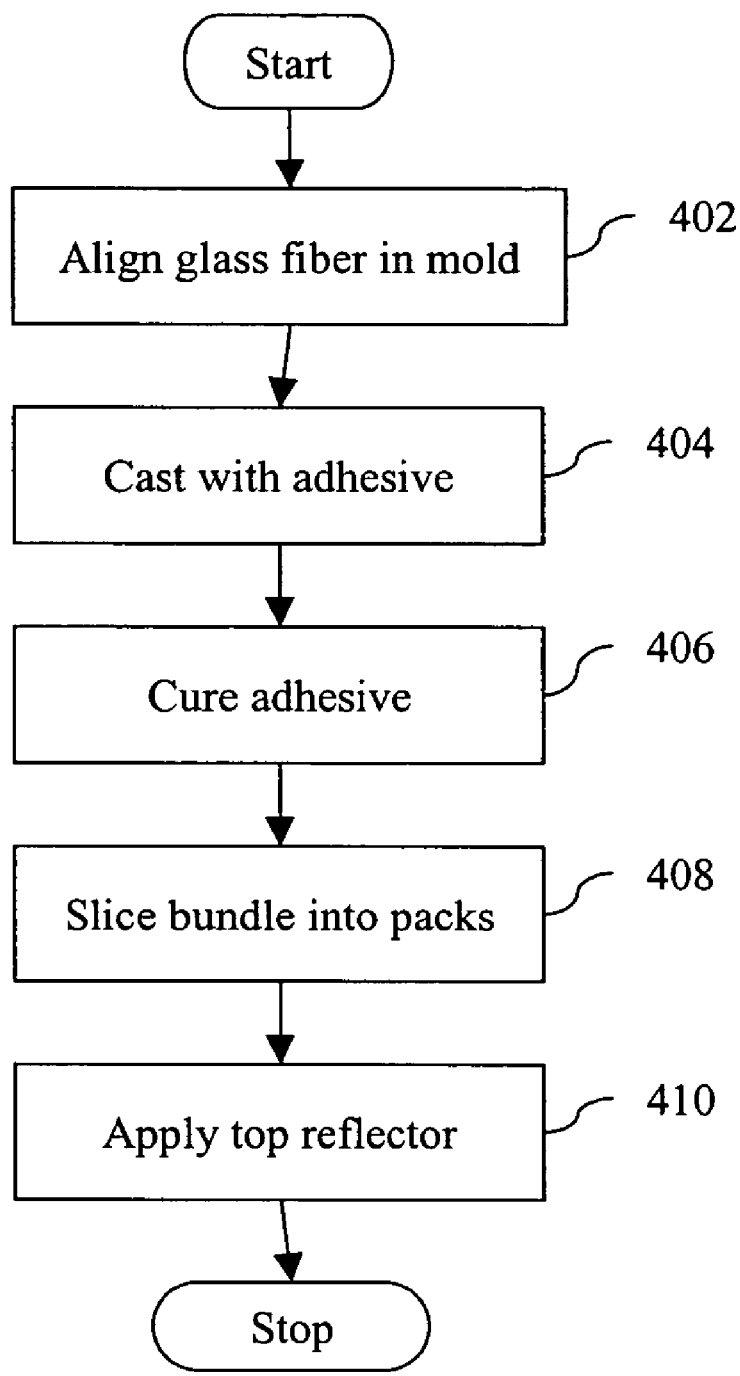
FIG. 4 is a flowchart illustrating a method of forming a pack using glass fiber.

FIG. 4 is a flowchart illustrating a method of forming pack 110 using glass fiber 308. At step 402, a plurality of glass fibers 308 are aligned in a mold. Then at step 404, the aligned glass fibers 308 are cast with an adhesive to obtain a bundle of glass fibers 308. In various embodiments, this adhesive is a $TiO_2$ loaded adhesive, such as commercially available Loctite F113 or EpoTek 301 filled with Dupont Ti-Pure R960 $TiO_2$ powder. The volume percentage of $TiO_2$ in this adhesive is about 20%. Other highly reflective oxide powder can also be used as the filler. Some examples are $Ta_2O_5$, PbO, $Bi_2O_3$, $HfO_2$, $ZrO_2$, $ThO_2$, $WO_3$, etc. Then at step 406, the adhesive is cured to solidify itself. Then at step 408, the bundle is sliced to obtain an individual pack 110. Finally at step 410, reflector 108 is applied to one end of pack 110. In various embodiments, the reflector 108 is applied by polishing an end of pack 110, and sputter coating the polished end with a reflective metal such as Aluminum (Al), Silver (Ag) or Gold (Au).

Figure 5:
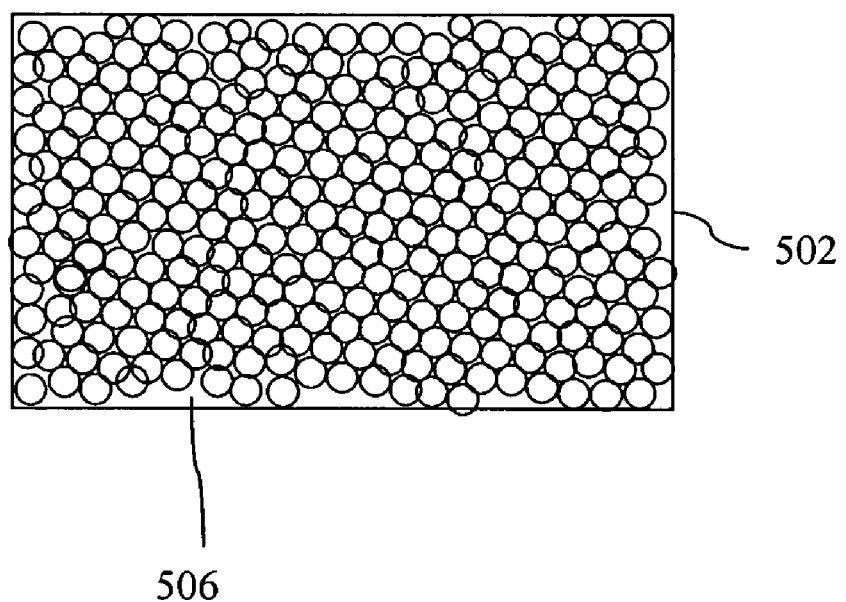
FIG. 5 shows the cross-section view of a pack according to two different embodiments of the invention.
Figure 5:
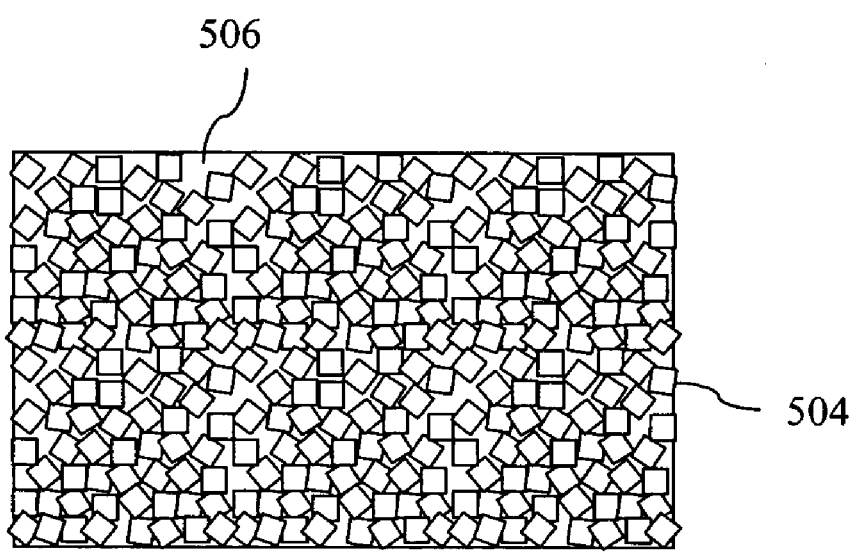

FIG. 5 shows the cross-section view of pack 110 according to two different embodiments of the invention. The figure shows circular fiber pack 502 and square fiber pack 504 according to two different embodiments. The figure also shows adhesive 506 that holds together packs 502 and 504. It should be obvious to a person skilled in the art that various other shapes of pack 110 may be achieved through various embodiments of the invention.

Various embodiments of the invention offer uniformity in imaging amongst the different pixels. Pack 110 when used as a scintillator array in CT systems offers uniformity in imaging amongst the different pixels. This is achieved by the homogenous fiber generated using the method described with reference to FIG. 2. Further, as the cross-sectional area of a single glass fiber is considerably lesser than the area of a photodiode, there is no need for aligning pack 110 with photodiodes 112. Also, pack 110 achieves higher X-ray dose efficiency than conventional scintillator arrays.

Further, various embodiments of the herein described methods and apparatus lead to improved image quality. This improved image quality is because there is little cross-talk between the various glass fibers in a pack.

Also, various embodiments of the herein described methods and apparatus provide a simpler and more cost effective process for producing packs. In addition, a pack in accordance with the herein described methods and apparatus can be used in conjunction with any photodiode array, irrespective of the arrangement of pixels on the photodiode array.

One technical effect of the herein described methods and apparatus is that they provide uniformity in imaging amongst the different pixels. This is achieved using the substantially homogeneous glass or glass ceramic fibers. Another technical effect is that herein described methods and apparatus reduce the difficulties involved in aligning packs with photodiodes. This is achieved by having a scintillator array including a plurality of glass or glass-ceramic fibers.

While the invention has been described in terms of various specific embodiments, those skilled in the art will recognize that the invention can be practiced with modification within the spirit and scope of the claims.

What is claimed is:

1. A composition comprising a fiber including at least one of a glass composition and a glass-ceramic composition, said composition containing a plurality of scintillator crystals, wherein an area of said fiber is less than an area of a photodiode that receives light output from said fiber, wherein the composition is made from a mixture of the scintillator crystals and the glass composition, wherein the mixture is sintered below a melting temperature of the glass composition and above a transition temperature of the glass composition, wherein the glass composition is a product of glass powder constituents comprising $SiO_2$, $Bi_2$, PbO, $TiO_2$, $K_2O$, BaO, SrO, $TeO_2$, and $Ta_2O_5$.

2. A composition in accordance with claim 1 wherein said composition has a refractive index of between 1.80 and 1.90.

3. A composition in accordance with claim 2 wherein said composition has a refractive index of about 1.85.

4. A composition in accordance with claim 1 wherein said scintillator crystals comprise crystals of at least one of Tb—Lu—Al—O—Ce, $LuSiO_5$:Ce, $Gd_2O_2S$:Pr,Ce,F, $Gd_3Ga_5O_{12}$:Cr,Ce, $LuAlO_3$:Ce, $Y_3Al_5O_{12}$:Ce, $Bi_4Ge_3O_{12}$, and $(Y_{1.67}Gd_{0.33}Eu_{0.1})O_2$.

5. A composition in accordance with claim 2 wherein said composition comprises a glass-ceramic.

6. A composition in accordance with claim 2 wherein said composition comprises a glass.

7. A scintillator array comprising a plurality of fibers comprising at least one of a glass and a glass-ceramic, said fibers including a plurality of scintillator crystals, wherein an area of one of said fibers is less than an area of a photodiode, wherein said fibers are made from a mixture of the scintillator crystals and the glass, wherein the mixture is sintered below a melting temperature of the glass and above a transition temperature of the glass, wherein the glass is a product of glass powder constituents comprising $SiO_2$, $Bi_2$, PbO, $TiO_2$, $K_2O$, BaO, SrO, $TeO_2$, and $Ta_2O_5$.

8. An array in accordance with claim 7 wherein said fibers are uniform in size.

9. An array in accordance with claim 8 wherein said fibers are substantially circular.

10. An array in accordance with claim 8 wherein said fibers are substantially non-circular.

11. An array in accordance with claim 7 wherein said fibers are non-uniform in size.

12. An array in accordance with claim 11 wherein said fibers are substantially circular.

13. An array in accordance with claim 11 wherein said fibers are substantially non-circular.

14. An array in accordance with claim 7 wherein said fibers are substantially circular.

15. An array in accordance with claim 7 wherein said fibers are substantially non-circular.

16. An array in accordance with claim 7 wherein said fibers have a reflective end coated with at least one of aluminum, gold, and silver.

17. An array in accordance with claim 7 wherein said fibers are sized between 1 and 10 μm.

18. An array in accordance with claim 7 wherein said fibers are bonded together with an adhesive including $TiO_2$.

19. An array in accordance with claim 18 wherein said fibers are coated with a first material layer and a second material layer above said first material layer, said first material layer having a reflective index lower than said second material layer.

20. An array in accordance with claim 19 wherein said second material layer comprises at least one of aluminum, gold, and silver.

21. A method comprising:
providing a glass powder with a particle size of between 1 and 5 μm, wherein the glass powder includes constituents including $SiO_2$, $Bi_2$, PbO, $TiO_2$, $K_2O$, BaO, SrO, $TeO_2$, and $Ta_2O_5$;
providing a plurality of scintillator crystals with a particle size of 1 to 20 μm;
mixing the glass powder and the scintillators together to obtain a resultant mixture wherein 40 to 80 volume percent is scintillator crystals and 20 to 60 volume percent is glass powder; and
forming a glass fiber from the mixture, wherein an area of the glass fiber is less than an area of a photodiode.

22. A method in accordance with claim 21 further comprising forming a fiber preform using the mixture by melting the mixture.

23. A method in accordance with claim 22 further comprising:
annealing the fiber preform; and
drawing the glass fiber from the annealed preform.

24. A method in accordance with claim 23 further comprising converting the drawn glass fiber into a glass-ceramic fiber.

25. A method in accordance with claim 24 further comprising forming a scintillator array using a plurality of glass-ceramic fibers.

26. A method in accordance with claim 25 further comprising forming the scintillator array using an adhesive with $TiO_2$.

27. A method in accordance with claim 21 further comprising forming a fiber preform using the mixture by sintering the mixture.

28. A method in accordance with claim 21 wherein the scintillator crystals include a combination of Tb, Lu, Al, O, and Ce.

29. A computed tomography (CT) system comprising:
an x-ray source; and
a detector positioned to receive x-rays emitted from said source, said detector comprising:
a photodiode array; and
a scintillator array positioned between said photodiode array and said source, said scintillator array comprising a plurality of fibers comprising at least one of a glass and a glass-ceramic, wherein an area of one of said fibers is less than an area of said photodiode, wherein said fibers are made from a mixture of a plurality of scintillator crystals and the glass, wherein the mixture is sintered below a melting temperature of the glass and above a transition temperature of the glass, wherein the glass is a product of glass powder constituents comprising $SiO_2$, $Bi_2$, PbO. $TiO_2$, $K_2O$, BaO, SrO, $TeO_2$, and $Ta_2O_5$.

* * * * *